(12) United States Patent
Chung

(10) Patent No.: US 7,853,973 B2
(45) Date of Patent: Dec. 14, 2010

(54) BROADCAST SIGNAL AND APPARATUS AND METHOD OF DECODING THE SAME

(75) Inventor: Young Tae Chung, Seoul (KR)

(73) Assignee: LG Electronics Inc., Seoul (KR)

( * ) Notice: Subject to any disclaimer, the term of this patent is extended or adjusted under 35 U.S.C. 154(b) by 950 days.

(21) Appl. No.: 11/318,476

(22) Filed: Dec. 28, 2005

(65) Prior Publication Data

US 2006/0143652 A1 Jun. 29, 2006

(30) Foreign Application Priority Data

Dec. 29, 2004 (KR) ............... 10-2004-0115209

(51) Int. Cl.
*H04N 5/445* (2006.01)
(52) U.S. Cl. ............... 725/41; 725/32; 725/39; 725/135
(58) Field of Classification Search ............ 725/41, 725/32, 135, 39, 32.41, 39.135
See application file for complete search history.

(56) References Cited

U.S. PATENT DOCUMENTS

| | | | |
|---|---|---|---|
| 7,150,029 B1 * | 12/2006 | Ebling et al. ............... 725/39 |
| 7,434,245 B1 * | 10/2008 | Shiga et al. ............... 725/43 |
| 2001/0029610 A1 | 10/2001 | Corvin et al. |
| 2002/0035726 A1 | 3/2002 | Corl |
| 2005/0193408 A1 * | 9/2005 | Sull et al. ............... 725/32 |

FOREIGN PATENT DOCUMENTS

| | | |
|---|---|---|
| EP | 1320257 A2 | 6/2003 |
| JP | 11-177944 | 7/1999 |
| JP | 2004-343598 | 12/2004 |

* cited by examiner

*Primary Examiner*—Joseph P Hirl
*Assistant Examiner*—Jivka Rabovianski
(74) *Attorney, Agent, or Firm*—McKenna Long & Aldridge LLP

(57) ABSTRACT

A broadcast signal includes an information table (EIT) or an application information table (AIT) which includes a descriptor. The descriptor includes image data representative of a thumbnail image to be displayed within an electronic program guide (EPG). A decoder decodes the EIT or AIT from a broadcast signal, and an application manager displays the thumbnail image within an EPG to indicate that a channel scheduled to carry a broadcast program is also scheduled to carry broadcast data simultaneously.

16 Claims, 8 Drawing Sheets

| Syntax | No. of Bits | Format |
|---|---|---|
| application_information_section(){ | | |
|     table_id | 8 | uimsbf |
|     section_syntax_indicator | 1 | bslbf |
|     reserved_future_use | 1 | bslbf |
|     reserved | 2 | bslbf |
|     section_length | 12 | uimsbf |
|     test_application_flag | 1 | bslbf |
|     application_type | 15 | uimsbf |
|     reserved | 2 | bslbf |
|     version_number | 5 | uimsbf |
|     current_next_indicator | 1 | bslbf |
|     section_number | 8 | uimsbf |
|     last_section_number | 8 | uimsbf |
|     reserved_future_use | 4 | bslbf |
|     common_descriptors_length | 12 | uimsbf |
|     for(i=0; i<N; i++) { | | |
|         descriptor | | |
|     } | | |
|     reserved_future_use | 4 | bslbf |
|     application_loop_length | 12 | imsbf |
|     for(i=0; i<N; i++) { | | |
|         application_identifier() | | |
|         application_control_code | 8 | uimsbf |
|         reserved_future_use | 4 | bslbf |
|         application_descriptors_loop_length | 12 | uimsbf |
|         for(j=0; j<N; j++){ | | |
|             descriptor() | | |
|         } | | |
|     } | | |
|     CRC_32 | 32 | Rpchof |
| } | | |

EPG

FIG. 3

| | No. of Bits | Identifier |
|---|---|---|
| event_information_table_section(){ | | |
|     table_id | 8 | uimsbf |
|     section_syntax_indicator | 1 | bslbf |
|     reserved_future_use | 1 | bslbf |
|     reserved | 2 | bslbf |
|     section_length | 12 | uimsbf |
|     source_id | 16 | uimsbf |
|     reserved | 2 | bslbf |
|     version_number | 5 | uimsbf |
|     current_next_indicator | 1 | bslbf |
|     section_number | 8 | uimsbf |
|     last_section_number | 8 | uimsbf |
|     transport_stream_id | 16 | uimsbf |
|     original_network_id | 16 | uimsbf |
|     segment_last_section_number | 8 | uimsbf |
|     last_table_id | 8 | uimsbf |
|     for(I=0; I<N; I++) { | | |
|         event_id | 16 | uimsbf |
|         start_time | 40 | bslbf |
|         duration | 24 | uimsbf |
|         running_status | 3 | uimsbf |
|         free_CA_mode | 1 | bslbf |
|         descriptor_loop_length | 12 | uimsbf |
|         for (j=0; j<N; j++) { | | |
|             descriptor | | |
|         } | | |
|     } | | |
|     CRC_32 | 32 | rpchof |
| } | | |

FIG. 4

|  | No. of Bits | Identifier |
|---|---|---|
| data_broadcast_thumbnail_descriptor () {<br>    descriptor_tag<br>    descriptor_length<br>    for (I=0; I<N; I++) {<br>        data_byte<br>    }<br>} | 8<br>8<br><br>8 | uimsbf<br>uimsbf<br><br>uimsbf |

FIG. 5

| Syntax | No. of Bits | Format |
|---|---|---|
| event_information_table_section(){ | | |
|     table_id | 8 | 0xCB |
|     section_syntax_indicator | 1 | '1' |
|     private_indicator | 1 | '1' |
|     reserved | 2 | '11' |
|     section_length | 12 | uimsbf |
|     source_id | 16 | uimsbf |
|     reserved | 2 | '11' |
|     version_number | 5 | uimsbf |
|     current_next_indicator | 1 | '1' |
|     section_number | 8 | uimsbf |
|     last_section_number | 8 | uimsbf |
|     protocol_version | 8 | uimsbf |
|     num_events_in_section | 8 | uimsbf |
|     for(j=0; j<num_events_in_section; j++){ | | |
|         reserved | 2 | '11' |
|         event_id | 14 | uimsbf |
|         start_time | 32 | uimsbf |
|         reserved | 2 | '11' |
|         ETM_location | 2 | uimsbf |
|         lenth_in_seconds | 20 | uimsbf |
|         title_length | 8 | uimsbf |
|         title_text() | var | |
|         reserved | 4 | '1111' |
|         descriptors_length | 12 | |
|         for(i=0; i<N; i++){ | | |
|             descriptor | | |
|         } | | |
|     } | | |
|     CRC_32 | 32 | rpchof |
| } | | |

FIG. 6

| Syntax | No. of Bits | Format |
|---|---|---|
| application_information_section(){ | | |
|     table_id | 8 | uimsbf |
|     section_syntax_indicator | 1 | bslbf |
|     reserved_future_use | 1 | bslbf |
|     reserved | 2 | bslbf |
|     section_length | 12 | uimsbf |
|     test_application_flag | 1 | bslbf |
|     application_type | 15 | uimsbf |
|     reserved | 2 | bslbf |
|     version_number | 5 | uimsbf |
|     current_next_indicator | 1 | bslbf |
|     section_number | 8 | uimsbf |
|     last_section_number | 8 | uimsbf |
|     reserved_future_use | 4 | bslbf |
|     common_descriptors_length | 12 | uimsbf |
|     for(i=0; i<N; i++) { | | |
|         descriptor | | |
|     } | | |
|     reserved_future_use | 4 | bslbf |
|     application_loop_length | 12 | imsbf |
|     for(i=0; i<N; i++) { | | |
|         application_identifier() | | |
|         application_control_code | 8 | uimsbf |
|         reserved_future_use | 4 | bslbf |
|         application_descriptors_loop_length | 12 | uimsbf |
|         for(j=0; j<N; j++){ | | |
|             descriptor() | | |
|         } | | |
|     } | | |
|     CRC_32 | 32 | Rpchof |
| } | | |

FIG. 7

| | No. of Bits | Identifier |
|---|---|---|
| application_icons_descriptor () { | | |
|     descriptor_tag | 8 | uimsbf |
|     descriptor_length | 8 | uimsbf |
|     icon_locator_length | 8 | uimsbf |
|     for (i=0; i<N; i++) { | | |
|         icon_locator_byte | 8 | uimsbf |
|     } | | |
|     icon_flags | 16 | bslbf |
|     for (I=0; I<N; I++) { | | |
|         reserved_future_use | 8 | bslbf |
|     } | | |
| } | | |

BROADCAST SIGNAL AND APPARATUS AND METHOD OF DECODING THE SAME

This application claims the benefit of Korean Patent Application No. 10-2004-0115209, filed on Dec. 29, 2004, which is hereby incorporated by reference as if fully set forth herein.

BACKGROUND OF THE INVENTION

1. Field of the Invention

The present invention relates to digital data broadcasting, and more particularly, to a broadcast signal and an apparatus and method of decoding a broadcast signal.

2. Discussion of the Related Art

Recently, digital data broadcasting has been seriously highlighted as a hot broadcasting issue. At present, in Korea, broadcasting companies are advancing experimental broadcasts for terrestrial broadcasting and are carrying out two-way data broadcasts for satellite broadcasting. In addition, the actual data broadcasting services of cable companies are close at hand.

In such digital broadcasting, information most useful to the user may be just channel and program guide information, namely, an electronic program guide (EPG) or advanced program guide (APG).

FIG. 1 shows an example of a general EPG provided in digital broadcasting.

As shown in FIG. 1, the user can acquire information, such as times and titles of broadcast programs and attendant services, from the EPG. That is, if the user pushes a remote controller key based on the EPG, he/she can view a broadcast programming list currently sent from a broadcasting station. Then, if the user clicks on a desired broadcast in the broadcast programming list, he/she can view the desired broadcast immediately. Therefore, there is no need to search a newspaper for the broadcast programming list.

Like this, the EPG is not only a core technology of the digital broadcasting, but also a basic service.

However, up to now, there is no method to indicate a data broadcast in the EPG. The data broadcast is a kind of multimedia service that a television (TV) provides like a personal computer (PC). This data broadcast is in the form of an additional signal or data information that is transmitted under the condition of being appended to a TV broadcast signal.

As a result, the user cannot determine, from the general EPG as shown in FIG. 1, whether a given program is a general program or a program containing a data broadcast.

SUMMARY OF THE INVENTION

Accordingly, the present invention is directed to a digital data broadcasting method and apparatus and a data structure thereof that substantially obviate one or more problems due to limitations and disadvantages of the related art.

An object of the present invention is to provide a digital data broadcasting method and apparatus and a data structure thereof which can let the user know that a specific program in an EPG is a program containing a data broadcast, and can simply show the user the contents of the data broadcast as a preview in the form of a small picture.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a broadcast signal for use in a digital television (DTV) receiver includes an event information table (EIT) or an application information table (AIT) including a descriptor. The descriptor includes image data representative of a thumbnail image to be displayed within an electronic program guide (EPG) for indicating whether a channel scheduled to carry a broadcast program is also scheduled to carry broadcast data simultaneously.

In another aspect of the present invention, an apparatus of decoding a broadcast signal includes a decoder and an application manager. The decoder decodes an event information table (EIT) or an application information table (AIT) from a broadcast signal, where the decoded table includes a descriptor which contains image data representative of a thumbnail image. The application manager initially displays an electronic program guide (EPG) on a screen and further displays the thumbnail image within the EPG in order to indicate that a channel scheduled to carry a broadcast program is also scheduled to carry broadcast data simultaneously.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIG. 3 is a view showing a bit stream syntax of an event information table used in DVB-SI according to the present invention;

FIG. 4 is a view showing a syntax of a data broadcast thumbnail descriptor according to the present invention;

FIG. 5 is a view showing a bit stream syntax of an event information table used in PSIP according to the present invention;

FIG. 6 is a view showing a syntax of an application information table (AIT) according to the present invention;

FIG. 7 is a view showing a syntax of an application icon descriptor according to the present invention.

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts.

The terminology used herein includes terms defined taking into consideration functions implemented in the present invention, and the definition thereof may be changed in accordance with the intention of skilled persons in the technical field or the custom in the technical field. Accordingly, the definition of the terminology must be determined based on the whole content of the present invention.

Figure 1:
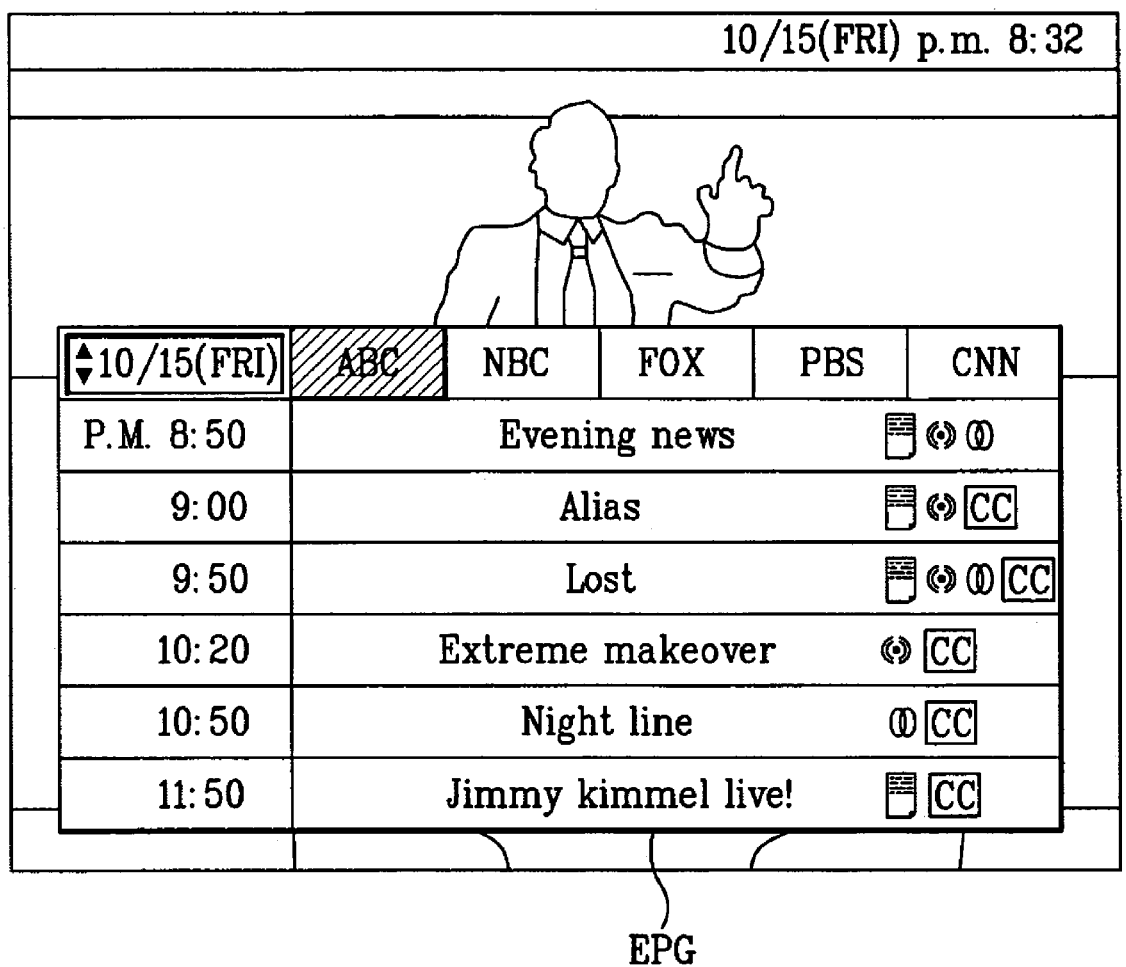
FIG. 1 is a view showing an example of a general EPG provided in digital broadcasting.
Figure 2:
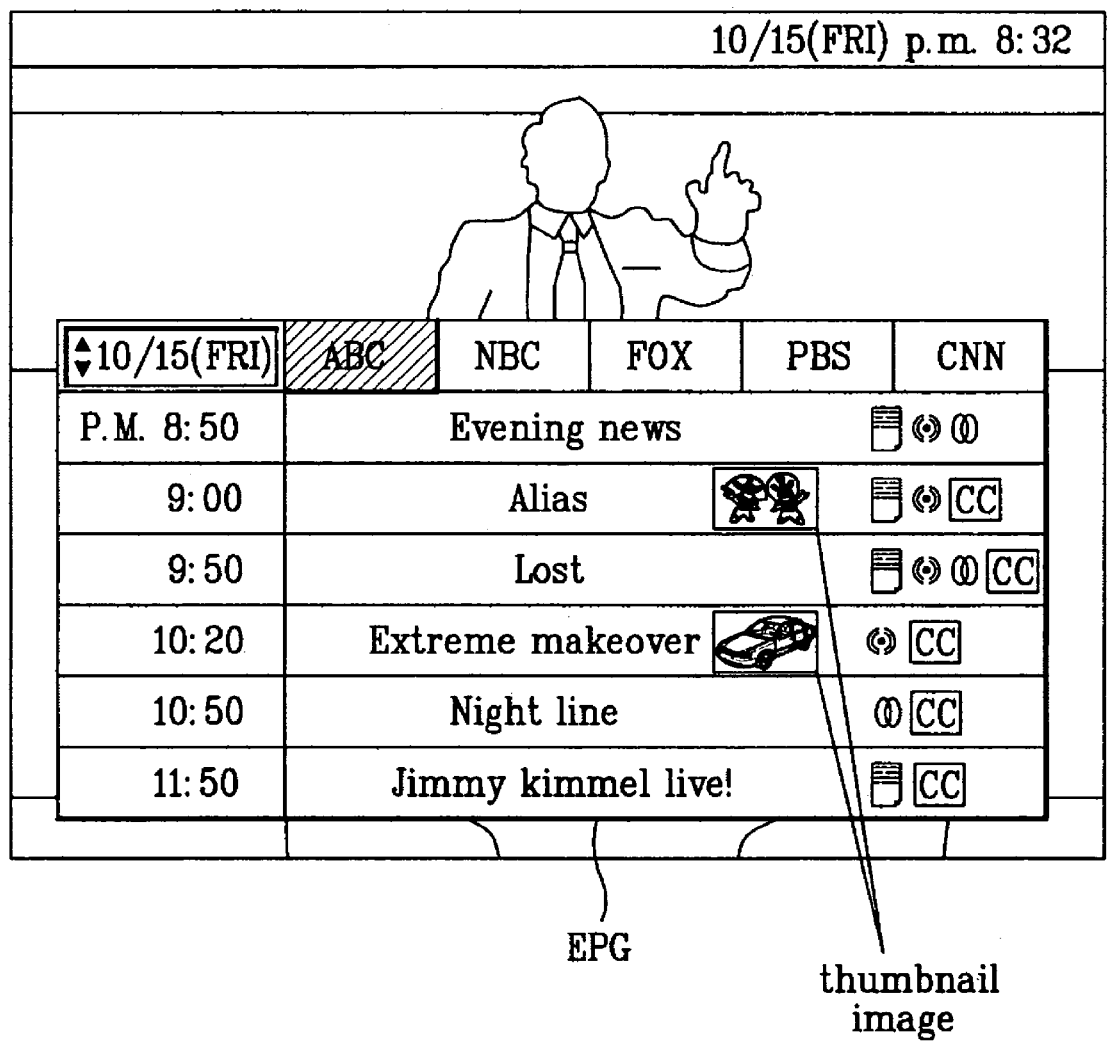
FIG. 2 is a view showing an example of EPG service containing a thumbnail image according to the present invention.

FIG. 2 shows an example of EPG service containing a thumbnail image according to the present invention.

As shown in FIG. 2, the EPG service according to the present invention provides a thumbnail image for a specific program containing a data broadcast, among programs in an EPG, so that the user can not only immediately know the fact that the data broadcast is present in the specific program, but also preview the contents of the data broadcast.

The thumbnail image may be a still image or a moving image in an animated graphics interchange format (GIF) or a multiple network graphics (MNG) format.

According to one embodiment of the present invention, in order to provide such a thumbnail image, a new descriptor may be additionally provided in an event information table (EIT).

The event information table includes information (a title, start time, play time, etc.) about an event of a virtual channel and is used in Program and System Information Protocol (PSIP), which is a North American SI standard, and Digital Video Broadcasting-Service Information (DVB-SI), which is a European SI standard.

The event information table has the same formats, but somewhat different contents, according to the respective standards. However, the same position and how to use the descriptor are applied in all the respective standards. A method for providing the thumbnail image using the descriptor of the event information table will hereinafter be described in detail with reference to the annexed drawings.

FIG. 3 shows a bit stream syntax of an event information table used in the DVB-SI according to the present invention.

As shown in FIG. 3, the event information table used in the DVB-SI of the European SI standard is composed of a plurality of fields to include the information about the event of the virtual channel, namely, a title, start time, play time, etc., as stated above. For reference, the event signifies one typical TV program.

The fields may be, for example, a "table_id" field for identifying the table, a "service_id" field for distinguishing a corresponding service from other services in a transport stream (TS), a "version_number" field for indicating the version of the event information table, a "section_number" field for indicating the number of a corresponding section, a "last_section_number" field for indicating the number of a last section of the event information table, and a "transport_stream_id" field for identifying the transport stream.

An event identification number is recorded in an "event_id" field in a repetitive statement of a 'for' loop, and a start time of the event is recorded in a "start_time" field in the repetitive statement. A play time of the event is recorded in a "duration" field in the repetitive statement, information regarding a running status of the event is recorded in a "running_status" field in the repetitive statement, and information about whether the stream was scrambled is recorded in a "free_CA_mode" field in the repetitive statement. The total length of descriptors is recorded in a "descriptor_loop_length" field in the repetitive statement.

Meanwhile, actual data of a thumbnail image file according to the present invention is contained in a "descriptor ( )" field in the repetitive statement of the 'for' loop, as shown in FIG. 4.

FIG. 4 shows a syntax of a data broadcast thumbnail descriptor according to the present invention.

As shown in FIG. 4, the descriptor for provision of a thumbnail image according to the present invention includes a "descriptor_tag" field, a "descriptor_length" field, and a "data_byte" field.

Information for identification of the descriptor is recorded in the "descriptor_tag" field, and information indicative of the overall length of the descriptor is recorded in the "descriptor_length" field.

Actual data of the thumbnail image is recorded in the "data_byte" field. The thumbnail image may be a still image in a portable network graphics (PNG) format, joint photographic experts group (JPEG) format or graphics interchange format (GIF), or a moving image in an animated GIF or MNG format.

The image data provided in thumbnail form may contain a summary of the contents of a data broadcast, or the contents of an advertisement. That is, the thumbnail image data can be utilized in various forms according to circumstances of a broadcasting station.

Meanwhile, the descriptor containing thumbnail image information according to the present invention is named "data_byte_thumbnail_descriptor ( )".

FIG. 5 shows an event information table in the American PSIP according to the present invention. As stated previously, the event information table in the PSIP is the same in format as that in the DVB-SI, although it is somewhat different in contents from that in the DVB-SI.

Therefore, the descriptor "data_byte_thumbnail_descriptor ( )" for the thumbnail image according to the present invention, described above with reference to FIG. 4, is equally applicable to the event information table in the PSIP. Descriptors of the event information table in the PSIP are included in a rectangular portion of FIG. 5.

On the other hand, in Multimedia Home Platform (MHP), which is a European data broadcast standard, OpenCable Application Platform (OCAP), which is a North American cable broadcast standard, and Advanced Common Application Platform (ACAP), which is a North American data broadcast standard for integration of a cable broadcast and terrestrial broadcast, an application information table (AIT) is used for transmission of data, or application.

Therefore, according to a different embodiment of the present invention, a thumbnail image may be inserted in the application information table, which will hereinafter be described with reference to the annexed drawings.

FIG. 6 shows a syntax of the application information table according to the present invention.

The application information table (AIT) as shown in FIG. 6 is defined to provide all information about the data broadcast, including an activation state of an application being transmitted.

To this end, the application information table includes applications and information associated therewith. The application information table has, at the upper level of descriptors, one common descriptor loop, which is divided into a sub-table application loop and a general application loop.

That is, each application in the general application loop has an application descriptor loop, which includes descriptors associated with the corresponding application. The application descriptors are indicated by a rectangular box in FIG. 6.

According to the present invention, a thumbnail image is expressed using an application icon descriptor application_icons_descriptor, among the application descriptors, as will hereinafter be described with reference to FIG. 7.

FIG. 7 shows a syntax of the application icon descriptor according to the present invention.

As shown in FIG. 7, the application icon descriptor includes "descriptor_tag", "descriptor_length", "icon_locator_length" and "icon_locator_byte" fields, and an "icon_flags" field.

Information for identification of this descriptor is recorded in the "descriptor_tag" field, information about the length of this descriptor is recorded in the "descriptor_length" field, and information about the length of the name of an icon file or a thumbnail image file according to the present invention is recorded in the "icon_locator_length" field.

The actual data of a thumbnail image according to the present invention is recorded in the "icon_locator_byte" field. Here, the thumbnail image may be a still image in a PNG format, JPEG format or GIF.

Notably, a moving image in an animated GIF or MNG format cannot be inserted in the "icon_locator_byte" field, because it is not suitable to a transmission format of the application icon descriptor.

The image data provided in thumbnail form may contain a summary of the contents of a data broadcast, or the contents of an advertisement, as stated previously. That is, the thumbnail image data can be utilized in various forms according to circumstances of a broadcasting station.

Meanwhile, the size and pixel aspect ratio of the thumbnail image are defined in the "icon_flags" field.

Figure 8:
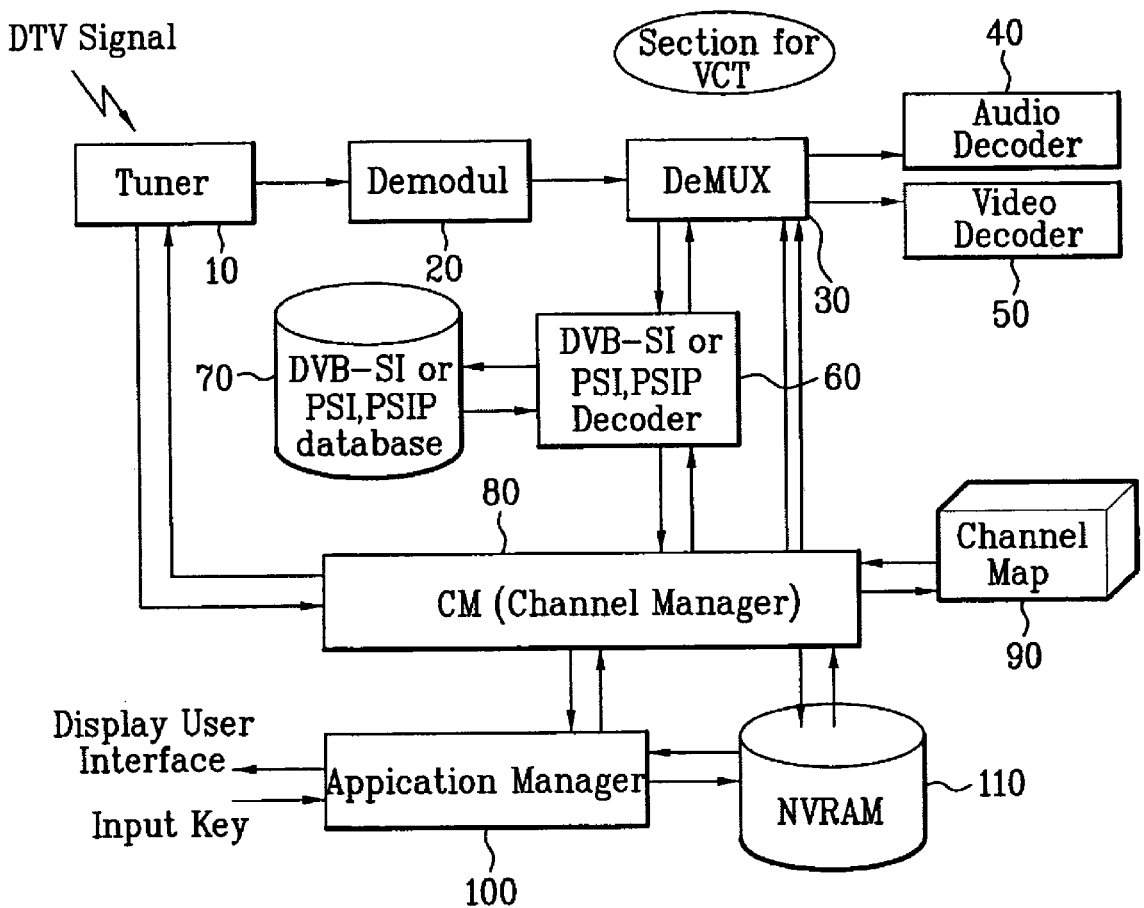
FIG. 8 is a block diagram schematically showing the internal configuration of a digital broadcast receiver according to the present invention.

FIG. 8 is a block diagram schematically showing the internal configuration of a digital broadcast receiver according to the present invention.

As shown in FIG. 8, the digital broadcast receiver according to the present invention comprises a tuner 10 for receiving broadcast signals being transmitted and tuning a signal of a specific channel selected by the user among the received broadcast signals, a demodulator 20 for demodulating the signal tuned by the tuner 10, a demultiplexer (DeMUX) 30 for demultiplexing the signal demodulated by the demodulator 20 into an audio signal, a video signal, a DVB-SI table and a PSIP table, an audio decoder 40 for decoding the audio signal from the DeMUX 30, a video decoder 50 for decoding the video signal from the DeMUX 30, a DVB-SI or PSIP decoder 60 for decoding the DVB-SI table or PSIP table from the DeMUX 30, a DVB-SI or PSIP database 70 for storing the decoded result of the DVB-SI table or PSIP table, a channel manager (CM) 80 for channel management, a channel map 90 for storing channel information therein, an application manager 100 for user interface, and a Non-Volatile Random Access Memory (NVRAM) 110 for storing information regarding the channel map 90 therein.

A description will hereinafter be given of the operation of the digital broadcast receiver with the above-stated configuration. First, a channel selection key signal from the user is inputted through the application manager 100. The channel manager 80 searches the channel information stored in the channel map 90 for the frequency of a channel corresponding to the inputted channel selection key signal.

The channel manager 80 sets the tuner 10 to the searched channel frequency such that the tuner 10 tunes a signal of the channel selected by the user. The signal tuned by the tuner 10 is demodulated by the demodulator 20 and then inputted to the demultiplexer 30.

Meanwhile, if the tuning of the selected channel has been performed, the tuner 10 sends a signal indicative of such a situation to the channel manager 80, which then sends information regarding the tuned channel to the DVB-SI or PSIP decoder 60 such that the DVB-SI or PSIP decoder 60 sets the demultiplexer 30 to a base PID (0x1FFB) for the search for a master guide table (MGT) or virtual channel table (VCT) or a PID for the search for an application information table (AIT).

The demultiplexer 30 searches the signal demodulated by the demodulator 20 for the master guide table, virtual channel table or application information table using the set PID and demultiplexes the searched table. The DVB-SI or PSIP decoder 60 searches for an event information table corresponding to an event information table PID contained in the demultiplexed master guide table or virtual channel table and stores information acquired by parsing the searched table in the DVB-SI or PSIP database 70. The DVB-SI or PSIP decoder 60 also stores information acquired by parsing the application information table in the DVB-SI or PSIP database 70. The information stored in the DVB-SI or PSIP database 70 is sent to the channel manager 80.

Upon determining that a descriptor "data_byte_thumbnail_descriptor ( )" containing a thumbnail image is present in the event information table (EIT) as a result of the parsing of that table, the channel manager 80 displays the thumbnail image on the screen through the application manager 100, along with EPG information.

If a thumbnail image is determined to be contained in the application information table as a result of the parsing of that table, the channel manager 80 displays the thumbnail image on the screen through the application manager 100, along with EPG information.

On the other hand, an A/V PID of the selected channel is set in the demultiplexer 30, which then demultiplexes the demodulated signal into an audio signal and a video signal using the set A/V PID and sends the demultiplexed audio signal and video signal respectively to the audio decoder 40 and video decoder 50. The audio and video decoders 40 and 50 decode the demultiplexed audio and video signals and output the decoded audio and video signals, respectively.

As apparent from the above description, the digital data broadcasting method and apparatus and the data structure thereof according to the present invention have effects as follows.

Firstly, summary information of a specific program placed in an EPG can be shown to the user as a preview in the form of a thumbnail image, so that the EPG can be intuitive and impressive.

Secondly, the thumbnail image can be utilized as an advertisement, so as to contribute to business of a broadcasting station.

Thirdly, the presence of a data broadcast in the EPG can be confirmed by the user. Therefore, a greater part of the data broadcast can be exposed to the user, thereby contributing to the spread of the data broadcast.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. An apparatus for decoding a media content, the apparatus comprising:
a decoder configured to decode an event information table (EIT) and an application information table (AIT) included in a broadcast signal, the decoded AIT comprising a descriptor which includes image data representative of a thumbnail image that indicates a channel within an electronic program guide (EPG) is scheduled to carry both a broadcast program associated with the EIT and an executable application associated with the AIT, and includes information defining at least one size and aspect ratio of the thumbnail image, wherein the application is carried within a data broadcast, and the data broadcast is in the form of an additional signal that is transmitted under the condition of being appended to the broadcast signal, wherein the AIT provides information about the application in the data broadcast, including an activation type and activation state of the application being transmitted; and an application manager configured to display the thumbnail image.

2. The apparatus of claim 1, wherein the thumbnail image represents a summary of the broadcast data.

3. The apparatus of claim 1, wherein the thumbnail image represents an advertisement of a broadcast station.

4. The apparatus of claim 1, wherein the thumbnail image is a still picture.

5. The apparatus of claim 1, wherein the image data representative of the thumbnail image is any one of PNG, GIF, and JPEG data.

6. The apparatus of claim 1, wherein the thumbnail image is a moving picture.

7. The apparatus of claim 6, wherein the image data representative of the thumbnail image is any one of animated GIF and MNG data.

8. The apparatus of claim 1, wherein the thumbnail image is to be displayed next to a title of the broadcast program within the EPG.

9. A method of decoding a media content, the method comprising:

decoding an event information table (EIT) and an application information table (AIT) included in a broadcast signal, the decoded AIT comprising a descriptor which includes image data representative of a thumbnail image that indicates a channel within an electronic program guide (EPG) is scheduled to carry both a broadcast program associated with the EIT and an executable application associated with the AIT, and includes information defining at least one size and aspect ratio of the thumbnail image, wherein the application is carried within a data broadcast, and the data broadcast is in the form of an additional signal that is transmitted under the condition of being appended to the broadcast signal, wherein the AIT provides information about the application in the data broadcast, including an activation type and activation state of the application being transmitted; and displaying the thumbnail image.

10. The method of claim 9, wherein the thumbnail image represents a summary of the broadcast data.

11. The method of claim 9, wherein the thumbnail image represents an advertisement of a broadcast station.

12. The method of claim 9, wherein the thumbnail image is a still picture.

13. The method of claim 12, wherein the image data representative of the thumbnail image is any one of PNG, GIF, and JPEG data.

14. The method of claim 9, wherein the thumbnail image is moving picture.

15. The method of claim 14, wherein the image representative of the thumbnail image is any one of animated GIF and MNG data.

16. The method of claim 9, wherein the thumbnail image is displayed next to a title of the broadcast program within the EPG.

* * * * *